Aug. 31, 1943.   J. T. MARVIN   2,328,160
FLUID SEALING DEVICE
Original Filed March 29, 1940

INVENTOR
JOHN T. MARVIN
BY
ATTORNEYS

Patented Aug. 31, 1943

2,328,160

UNITED STATES PATENT OFFICE 2,328,160

FLUID SEALING DEVICE

John T. Marvin, Dayton, Ohio, assignor to General Motors Corporation, Detroit, Mich., a corporation of Delaware Original application March 29, 1940, Serial No. 326,711, now Patent No. 2,299,638, dated October 20, 1942. Divided and this application February 6, 1942, Serial No. 429,787

2 Claims. (Cl. 286—11)

This application is a division of S. N. 326,711, filed March 29, 1940, now Patent No. 2,299,638, issued October 20, 1942.

This invention relates to fluid sealing devices and is particularly concerned with devices wherein the parts thereof are self contained.

It is an object of the invention to provide a fluid seal assembly which includes a resilient sealing member that contains a spring, said spring being adapted to act upon said sealing member for simultaneously expanding the member axially and for radially changing the diameter of a portion of the member.

In carrying out the above object it is a further object in some cases to provide a circumferential groove in the sealing member adapted to receive one end of the spring.

Another object is to provide a self contained fluid sealing device wherein a spring is associated with a resilient sealing member so as to expand the member radially outwardly and simultaneously expand the member axially.

Further objects and advantages of the present invention will be apparent from the following description, reference being had to the accompanying drawing wherein preferred embodiments of the present invention are clearly shown.

Fluid seals of the type used to seal refrigerator compressors, automotive water pumps, washing machine drive shafts and the like, are required to perform the dual function of sealing simultaneously at two points remote from one another and likewise are required to be inexpensive and flexible with regard to installation.

Fluid seals of this type are shown in Patent No. 2,263,178, issued November 18, 1941, and in Patent No. 2,167,986, both assigned to the assignee of the present invention. In Patent No. 2,263,178, an assembly is described wherein the spring is of a cylindrical type which bears concomitantly upon two end flanges of a sealing member. In Patent No. 2,167,986, a seal assembly is shown wherein a circumferential spring is provided in the sealing member at one end thereof, for providing a definite shape and giving resiliency thereto and holding the flange in an annular groove in the housing, if desired. The present invention is particularly directed to a fluid seal wherein the desirable qualities of both of the aforementioned seals are incorporated in a sngle unit without any additional manufacturing expense and in fact with a reduced number of parts.

Figure 1:
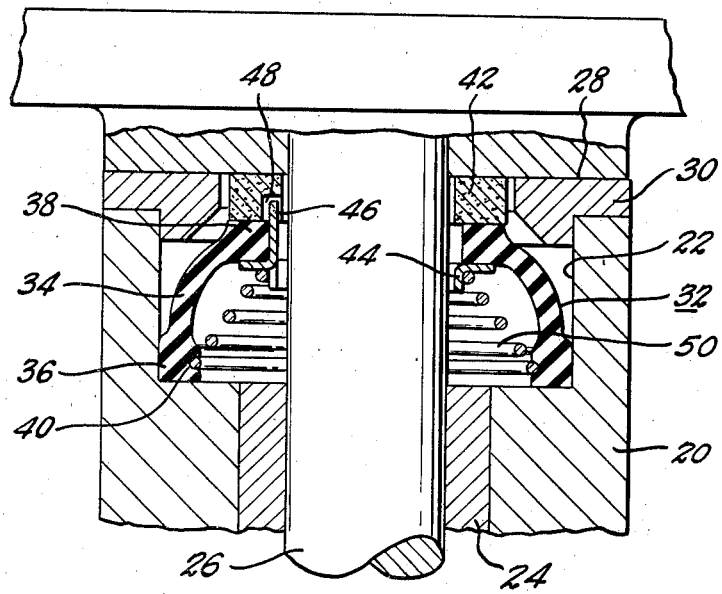
Figure 1 shows a fluid seal in combination with a shaft and housing therefor.

Referring to the drawings and more particularly to Figure 1, 20 illustrates a housing which may be the upper portion of a washing machine agitator housing, the inner end of a bearing assembly for automobile water pumps or the housing of a compressor. The housing 20 includes a cavity 22 therein of annular formation and a bearing 24 which acts as a journal for a rotating shaft 26. The shaft 26 has at one end thereof a sealing surface 28 which is hermetically attached thereto or may be an integral portion thereof. The housing 20 also includes a thrust washer 30 which bears against a portion of the sealing surface 28 to relieve the thrust load on the sealing assembly to be described hereinafter.

Within the cavity 22, a sealing assembly 32 is shown which includes an annular sleeve 34 of resilient material such as polymerized isoprene, Neoprene, Chloroprene, rubber or any like suitable material which may be used under the required conditions of the operation without being deleteriously affected by the fluid being sealed. The sleeve 34 includes two end flanges 36 and 38 thereon which are integral with the sleeve. Flange 36 has molded therein an annular groove 40 which extends entirely around the inner periphery of the flange 36. Flange 38 bears against a sealing washer 42 made from porous metal, thermosetting resin, etc., many examples of which are given in the previously mentioned Patent No. 2,263,178. The sealing washer bears directly against the sealing surface 28 and seals therewith. A spring retaining washer 44 is disposed within the sealing member 34 and preferably has one or more ears 46 thereon which are adapted to fit within a notch 48 in the sealing washer 42. In this manner, the washer 42 is prevented from rotating relative to the sealing member 34.

A spiral spring 50 is enclosed by the member 34 and bears at one end thereof on the spring retaining washer 44 and at the other end thereof is adapted to snap within the groove 40 by means of radially compressing the spring sufficiently to permit the same to be placed within the groove 40. After the spring 50 is in place the flange 36 is expanded radially outwardly so that when the sealing member 34 is in the cavity 22, the flange 36 is spread into sealing engagement with the wall of the cavity 22. Simultaneously, the spring 50 tends to elongate the sealing member 34 axially of shaft 26 whereby the member 34 is yieldingly urged against the sealing surface. The spring 50, at the large diameter end thereof includes a complete loop which is capable of radial inward compression and includes a second complete loop at the smaller diameter end thereof, so that the pressure exerted on washer 44 is substantially uniform around the periphery thereof.

The sealing unit 32, is unitary in structure since the spring 50 when assembled in place within the sealing member 34, becomes substantially a part thereof and the sealing member 34, spring 50 and spring retaining washer 44 are held together as a unit by means of the spring 50 snapped into groove 40.

It will be apparent, that the sealing assembly 32 when in place within cavity 22, is compressed axially to a length less than the free length of the assembly. This compression supplies the sealing pressure against the surface 28 and also aids in sealing the flange 36 in the cavity. In this manner, the flange 36 is not only sealed axially of the shaft, but is also sealed by the expansion of spring 50 within groove 40 in a place perpendicular to the axis of the shaft, thereby providing a seal which functions properly under all conditions of use and is easily applied and not dependent upon accurate machining since, due to the flexibility of the unit and the capability of radial expansion of the flange 36, it is unnecessary to use great accuracy in the machining of cavity 22 and likewise it is unnecessary to depend on a single seal between the end faces of the flange 36 and the housing. In other words, I have provided a sealing assembly which fits snugly into a cavity or groove and seals therewith in two planes while simultaneously providing a seal against a rotating member.

It is apparent, that the seal may also be carried in the rotating member and sealed against the stationary member and also that the sealing washer 42 may be eliminated providing the flange 38 is made of harder material and the remainder of the sealing member 34, such a type of seal being disclosed in the copending Geyer's application Patent No. 2,227,304 assigned to the assignee of the present invention.

Figure 2:
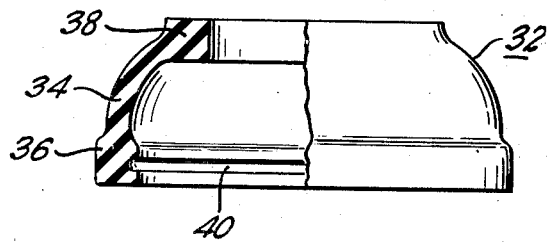
Figure 2 shows a partial sectional view of the sealing member shown in Fig. 1, particularly illustrating the circumferential groove therein.
Figure 3:
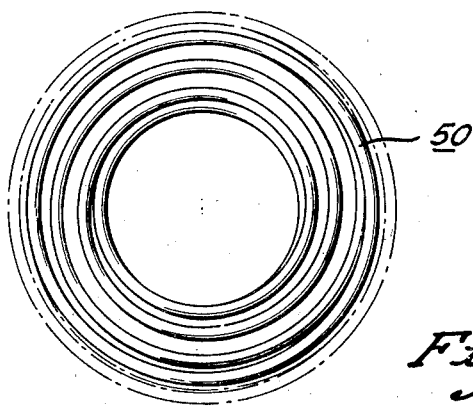
Figure 3 is a top plan view of the spiral spring used in connection with the fluid seal shown in Fig. 1.

In Fig. 1 through Fig. 3, the spring provides a dual function of sealing the seal member radially, as well as, expanding the same axially for forming a second seal.

While the embodiments of the present invention as herein disclosed, constitute preferred forms, it is to be understood that other forms might be adopted, all coming within the scope of the claims which follow.

What is claimed is as follows:

1. In combination with two members relatively rotatable with respect to one another, of a self-contained fluid sealing assembly comprising: an annular resilient sleeve having opposed end flanges at either end thereof, one of said flanges being adapted to fit within a cavity in one of said relatively rotatable members, a sealing surface carried by the other of said relatively rotatable members, said flange in said cavity including an internal circumferential groove therein and a single conical spring adapted to be compressed radially inwardly at its large diameter end so as to fit into said groove and to be compressed axially between said groove and said other flange for causing the sleeve to expand axially into sealing contact with said sealing surface and for causing the sleeve to expand radially outwardly into sealing contact with the walls of said cavity.

2. In a fluid seal, a self-contained unit comprising, a flexible annular sleeve adapted to enclose a shaft, spaced and opposed resilient integral end flanges on said sleeve, one of said end flanges including a molded internal circumferential groove therein, a single conical spring located within said sleeve and adapted to have the smaller end thereof to bear against an internal end face of one of said flanges and to be snapped into said groove by inward radial pressure at the other end thereof, the distance between said internal end face and said groove being less than the free length of said spring, said spring acting to expand the sleeve radially outwardly adjacent the grooved end flange thereof and to simultaneously expand the sleeve axially.

JOHN T. MARVIN.